United States Patent [19]
Schmer

[11] 4,122,250
[45] Oct. 24, 1978

[54] SEPARATION OF HIGH-ACTIVITY HEPARIN BY AFFINITY CHROMATOGRAPHY

[76] Inventor: Gottfried Schmer, 4944 NE. 85th St., Seattle, Wash. 98115

[21] Appl. No.: 826,676

[22] Filed: Aug. 22, 1977

[51] Int. Cl.² .............................................. C08B 37/10
[52] U.S. Cl. ..................................................... 536/21
[58] Field of Search .......................................... 536/21

[56] References Cited
U.S. PATENT DOCUMENTS
3,099,600 7/1963 Toccaceli ................................ 536/21

FOREIGN PATENT DOCUMENTS
1,195,010 6/1965 Fed. Rep. of Germany ............. 536/21

OTHER PUBLICATIONS
R. Bohn et al., J. Chromatogr., 62(3), 399–408 (1971).
R. Bohn et al., J. Chromatogr., 62(3), 409–415 (1971).

Primary Examiner—Sidney Marantz
Attorney, Agent, or Firm—Holman & Stern

[57] ABSTRACT

An affinity chromatography method for the separation of high-activity heparin from a mixture thereof with low-activity heparin. The method employs an affinity column of DEAE-Sephadex and a series of sodium chloride-imidazole elution buffers (pH 6.5–7.5) varying in sodium chloride molarity from about 0.5 to about 1.0. Stepwise elution of a plurality of heparin fractions from the affinity column with the elution buffers of successively increasing sodium chloride molarity results in the removal from the affinity column of first the low-activity heparin and finally the high-activity heparin.

8 Claims, No Drawings

SEPARATION OF HIGH-ACTIVITY HEPARIN BY AFFINITY CHROMATOGRAPHY

BACKGROUND OF THE INVENTION

This invention relates generally to the isolation of high-activity heparin and, more particularly, to the separation of heparin into fractions of relatively high specific activity and relatively low specific activity by affinity chromatography.

Heparin is a highly sulfated dextrorotatory mucopolysaccharide which is commonly employed in various biomedical applications for its anticoagulant properties in prolonging the clotting time of whole blood. It is typically isolated from mammalian tissue, such as animal livers, lungs or intestines, and thereafter purified by methods well known in the art. The anticoagulant potency of the isolated and purified heparin, is generally referred to as its "specific activity" and expressed as USP units/mg.

Commercially available heparin typically has a specific activity of approximately 150 USP units/mg, and has previously been shown to be composed of a mixture of different heparin species varying in their specific activities. Several different techniques have previously been proposed for effecting a separation of the heparin of relatively high specific activity out of its mixture with heparin of relatively low specific activity, including gel filtration, density gradient centrifugation of the heparin-heparin cofactor complex, affinity chromatography on heparin-cofactor agarose, and ion-exchange chromatography on DEAE-cellulose. However, none of these procedures has proved to be practical for the large scale isolation of high-activity heparin in high yield.

SUMMARY OF THE INVENTION

It is, accordingly, a primary object of this invention to provide an improved procedure for the isolation of high-activity heparin in relatively high yields practical for large scale commercial production.

Another object of the invention is to provide an improved procedure for the separation of high-activity heparin from a mixture thereof with low-activity heparin employing affinity chromatography techniques.

A further object of the invention is to provide an improved procedure for the isolation of high-activity heparin in accordance with the preceding objects, which is relatively simple and economical to perform.

The above and other objects are achieved in accordance with the present invention by providing an affinity chromatography method by which commercially available heparin may be readily separated into fractions of relatively high specific activity and relatively low specific activity. The method utilizes an affinity column of packed gel comprising the diethylaminoethyl ether of cross-linked polydextran. The mixture of high-activity heparin and low-activity heparin (e.g., commercially available heparin) is dissolved in a solvent of about 0.5 molar sodium chloride buffered with about 0.01–0.03 molar imidazole to pH 6.5–7.5, and the resulting heparin solution is then applied onto the affinity column. Thereafter, a plurality of heparin fractions are successively eluted from the affinity column with a series of elution buffers of successively increasing molarity of sodium chloride buffered with about 0.01–0.03 molar imidazole to pH 6.5–7.5. The elution buffers employed have a sodium chloride molarity ranging from about 0.5 to about 1.0. In this manner, there is effected a stepwise removal from the affinity column of first the heparin of relatively low specific activity and finally the heparin of relatively high specific activity.

DESCRIPTION OF PREFERRED EMBODIMENTS

The affinity chromatography method of the present invention employs an affinity column of packed gel comprising the diethylaminoethyl ether of cross-linked polydextran, for example, DEAE-Sephadex manufactured by Pharmacia Fine Chemicals, Uppsala, Sweden, and described in their publication "Sephadex Ion Exchangers-A Guide to Ion Exchange Chromatography" (June 1976). Prior to use, the DEAE-Sephadex should first be acid-base cycled as described by the manufacturer, i.e., treated first with 0.2–0.5 N HCl and then with 0.2–0.5 N NaOH. Thereafter, the affinity column should be equilibrated with the same solvent used in preparing the heparin loading solution, i.e., 0.5 molar sodium chloride buffered with about 0.01–0.03 molar imidazole to pH 6.5–7.5.

The heparin starting material employed in the method of the present invention is composed of a mixture of heparin of relatively high specific activity and heparin of relatively low specific activity, such as heparin commercially available from various sources, for example, Abbott Laboratories, North Chicago, Illinois, and Sigma Chemical Co., St. Louis, Missouri. A loading solution of the heparin mixture is prepared by dissolving the heparin mixture in a solvent of about 0.5 molar sodium chloride buffered with about 0.01–0.03 molar imidazole of pH 6.5–7.5. Preferably, such solvent is buffered with 0.02 molar imidazole to pH 7.35.

The heparin loading solution is then applied onto the DEAE-Sephadex affinity column, preferably in an amount equivalent to about 2 grams of heparin per 100 ml of packed gel.

The heparin is then eluted from the affinity column in a plurality of fractions by successive elution with a series of sodium chloride-imidazole elution buffers of successively increasing sodium chloride molarity ranging from about 0.5 to about 1.0. Each of the elution buffers is buffered with about 0.01–0.03, preferably 0.02, molar imidazole to pH 6.5–7.5, preferably 7.35. The stepwise elution is preferably carried out so as to obtain four separate heparin fractions, employing a first elution buffer of 0.5 molar sodium chloride, a second elution buffer of 0.6 molar sodium chloride, a third elution buffer of 0.75 molar sodium chloride, and a fourth elution buffer of 1.0 molar sodium chloride. Preferably, the amount of elution buffer which is employed for eluting each heparin fraction is about 200–400 ml per 100 ml of packed gel.

In this manner, there is effected a stepwise removal from the affinity column of first the heparin of relatively low specific activity and finally the heparin of relatively high specific activity. The penultimate heparin fraction eluted with the 0.75 molar sodium chloride elution buffer will generally contain the largest percentage of the total starting heparin (i.e., about 65–75 percent) and will generally have a specific activity ranging from about 90 to about 150 USP units/mg. The final heparin fraction eluted with the 1.0 molar sodium chloride elution buffer, will generally contain from about 10 to about 25 percent of the total starting heparin and will have a high specific activity of about 340 USP units/mg.

The invention is further illustrated by way of the following examples.

EXAMPLE 1

A plastic affinity column (5 × 30 cm) packed with 250 ml DEAE-Sephadex gel was treated first with 0.5 N HCl, then with 0.5 N NaOH, and thereafter equilibrated with 0.5 molar sodium chloride — 0.02 molar imidazole buffer solution, pH 7.35. A heparin loading solution was prepared by dissolving 5 g commercial heparin (Sigma Chemical Co.) in 200 ml 0.5 molar sodium chloride — 0.02 molar imidazole buffer solution, pH 7.35. The loading solution was applied onto the equilibrated DEAE-Sephadex affinity column. Stepwise elution was then carried out with 1,000 ml of each of 0.5, 0.6, 0.75, and 1.0 molar sodium chloride elution buffers, each buffered with 0.02 molar imidazole to pH 7.35. Each of the resulting fractions eluted from the affinity column was analyzed for heparin specific activity by both the kaolin activated partial thromboplastin time assay of Proctor et al (Am. J. Clin. Path. 36:212-219, 1961) and the Xa neutralization assay of Yin et al (J. Lab. Clin. Med. 81:298-310, 1973). The percentage of the total starting heparin which was found in each fraction, and the specific activity of heparin in each fraction, are shown in Table I, below, wherein the specific activity of heparin is expressed as USP units/mg lyophilized heparin (after desalting over a Sephadex G-25 column, one ml heparin solution over a 1 × 10 ml glass column).

TABLE I

| Fraction (M NaCl) | Heparin Content (% of Total Loaded) | Heparin Specific Activity (USP units/mg) |
|---|---|---|
| 0.5 | 4.3 | 5 |
| 0.6 | 17 | 58 |
| 0.75 | 66.3 | 145 |
| 1.0 | 12.4 | 340 |

EXAMPLE 2

The procedure described in Example 1 was repeated, but employing as the heparin loading solution 50 vials of Heparin "Abbott" (Abbott Laboratories), constituting about 5 g heparin, to which were added sodium chloride and imidazole to obtain 0.5 molar sodium chloride — 0.02 molar imidazole, pH 7.35. The percentage of the total starting heparin found in each fraction eluted from the affinity column, and the heparin specific activity of each fraction, are shown in Table II, below.

TABLE II

| Fraction (M NaCl) | Heparin Content (% of Total Loaded) | Heparin Specific Activity (USP units/mg) |
|---|---|---|
| 0.5 | — | — |
| 0.6 | 5 | — |
| 0.75 | 74 | 93 |
| 1.0 | 21 | 340 |

The embodiments of the invention in which an exclusive property or privilege is claimed are defined as follows:

1. An affinity chromatography method for the separation of heparin of relatively high specific activity from a mixture thereof with heparin of relatively low specific activity, comprising the steps of:
   (a) preparing a solution of said heparin mixture in a solvent of about 0.5 molar sodium chloride buffered with about 0.01–0.03 molar imidazole to pH 6.5–7.5;
   (b) applying said heparin solution onto an affinity column of packed gel comprising the diethylaminoethyl ether of cross-linked polydextran; and
   (c) successively eluting a plurality of heparin fractions from said affinity column with a series of elution buffers of successively increasing molarity of sodium chloride buffered with about 0.01–0.03 molar imidazole to pH 6.5–7.5, said elution buffers having a sodium chloride molarity ranging from about 0.5 to about 1.0, so as to effect a stepwise removal from said affinity column of first the heparin of relatively low specific activity and finally the heparin of relatively high specific activity.

2. The method of claim 1, wherein the elution buffer employed in eluting the final heparin fraction of relatively high specific activity has a sodium chloride molarity of about 1.0.

3. The method of claim 2, wherein the elution buffer employed in eluting the penultimate heparin fraction has a sodium chloride molarity of about 0.75.

4. The method of claim 3, wherein said series of elution buffers comprises a first elution buffer of 0.5 molar sodium chloride, a second elution buffer of 0.6 molar sodium chloride, a third elution buffer of 0.75 molar sodium chloride, and a fourth elution buffer of 1.0 molar sodium chloride.

5. The method of claim 4, wherein said solvent and each of said elution buffers is buffered with 0.02 molar imidazole to pH 7.35.

6. The method of claim 1, wherein said affinity column is equilibrated with an additional amount of said solvent prior to application of said heparin solution.

7. The method of claim 1, wherein the amount of said heparin solution which is applied onto said affinity column is equivalent to about 2 grams of heparin per 100 ml of packed gel.

8. The method of claim 1, wherein the amount of elution buffer which is employed for eluting each heparin fraction is about 200–400 ml per 100 ml of packed gel.

* * * * *